US009606655B2

(12) United States Patent
Choo et al.

(10) Patent No.: US 9,606,655 B2
(45) Date of Patent: Mar. 28, 2017

(54) DISPLAY DEVICE HAVING TOUCH SENSOR EMBEDDED IN PIXEL ARRAY AND METHOD OF DRIVING THE SAME (75) Inventors: Kyo-Hyuck Choo, Gyeonggi-do (KR); Jung-Hoon Seo, Gyeonggi-do (KR); Sang-Soo Hwang, Seoul (KR); Sun-Yeop Kim, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 848 days.

(21) Appl. No.: 13/227,626

(22) Filed: Sep. 8, 2011

(65) Prior Publication Data

US 2012/0056835 A1 Mar. 8, 2012

(30) Foreign Application Priority Data

Sep. 8, 2010 (KR) ........................ 10-2010-0088117

(51) Int. Cl.
*G06F 3/041* (2006.01)
*G06F 3/042* (2006.01)
*G06F 3/044* (2006.01)

(52) U.S. Cl.
CPC ............ *G06F 3/0412* (2013.01); *G06F 3/042* (2013.01); *G06F 3/044* (2013.01)

(58) Field of Classification Search
CPC .................................................. G06F 3/0412
USPC ................................................. 345/173–175
See application file for complete search history.

(56) References Cited

U.S. PATENT DOCUMENTS 5,534,892 A 7/1996 Tagawa
6,323,846 B1* 11/2001 Westerman et al. .......... 345/173
2004/0227743 A1* 11/2004 Brown .......................... 345/204
2008/0062139 A1* 3/2008 Hotelling et al. ............ 345/173
2008/0246739 A1 10/2008 Choi et al.
(Continued)

FOREIGN PATENT DOCUMENTS

CN 101644839 A 2/2010
EP 1 455 264 A2 9/2004
(Continued)

OTHER PUBLICATIONS

Taiwanese Patent Application No. 100131780; Office Action dated Feb. 18, 2014.
(Continued)

*Primary Examiner* — Temesghen Ghebretinsae
*Assistant Examiner* — Hang Lin
(74) *Attorney, Agent, or Firm* — Morgan, Lewis & Bockius LLP (57) ABSTRACT A display device having touch sensors and a method of driving the same are disclosed. The display device includes a display panel including a pixel array including pixels and a touch sensor array including touch sensors formed in the pixel array, the pixel array being divided into blocks, a gate driver to sequentially drive a plurality of gate lines in the pixel array in a block unit, a data driver to drive a plurality of data lines in the pixel array when the gate lines are driven, a touch controller to sequentially drive the touch sensor arrays in the block unit, and a timing controller to divide one frame into at least one display mode at which the pixel array is driven and at least one touch sensing mode at which the touch sensor array is driven and to control the gate drive, the data driver and the touch controller so that the display mode and the touch sensing mode alternate.

17 Claims, 7 Drawing Sheets

(56) References Cited

U.S. PATENT DOCUMENTS

| | | | | |
|---|---|---|---|---|
| 2009/0303193 | A1* | 12/2009 | Lim | G06F 3/0416 345/173 |
| 2010/0026636 | A1* | 2/2010 | Jang et al. | 345/173 |
| 2010/0134457 | A1* | 6/2010 | Katoh et al. | 345/207 |
| 2010/0253638 | A1* | 10/2010 | Yousefpor | G06F 3/0412 345/173 |
| 2011/0043483 | A1* | 2/2011 | Mizuhashi et al. | 345/174 |
| 2011/0141151 | A1 | 6/2011 | Fujioka et al. | |
| 2011/0157069 | A1* | 6/2011 | Zhuang | G06F 3/044 345/174 |
| 2012/0050217 | A1* | 3/2012 | Noguchi | G06F 3/0412 345/174 |
| 2012/0146028 | A1* | 6/2012 | Oda et al. | 257/53 |
| 2014/0327654 | A1* | 11/2014 | Sugita | G06F 3/044 345/174 |

FOREIGN PATENT DOCUMENTS

| | | |
|---|---|---|
| EP | 2 221 659 A1 | 8/2010 |
| JP | 04-310995 | 11/1992 |
| JP | 09-073367 | 3/1997 |
| JP | 2006-243850 | 9/2006 |
| JP | 2009-294903 | 12/2009 |
| KR | 10-2004-0077542 A | 9/2004 |
| KR | 10-2008-0090886 A | 10/2008 |
| TW | 236006 | 12/1994 |
| TW | 200511822 | 3/2005 |
| TW | 200719200 | 5/2007 |
| TW | 200917103 | 4/2009 |
| TW | 201017264 | 5/2010 |
| TW | I327708 B | 7/2010 |
| TW | I414845 B | 11/2013 |
| WO | 2009-110294 | 9/2009 |
| WO | 2009-125644 | 10/2009 |

OTHER PUBLICATIONS

Office Action issued in counterpart Chinese Patent Application No. 201110271303.3 dated Nov. 4, 2013.

Extended European Search Report dated Apr. 1, 2016, in corresponding EP Application No. 11007242.8.

\* cited by examiner

DISPLAY DEVICE HAVING TOUCH SENSOR EMBEDDED IN PIXEL ARRAY AND METHOD OF DRIVING THE SAME

This application claims the benefit of Korean Patent Application No. 10-2010-0088117, filed on Sep. 8, 2010, which is hereby incorporated by reference in its entirety.

BACKGROUND OF THE INVENTION

Field of the Invention

The present invention relates to a display device having a touch sensor, and more particularly to a display device that divides a period of time and alternately drives a touch sensor and a display area, thereby reducing the occurrence of noise and sensing time, and a method of driving the same.

Discussion of the Related Art

In recent years, a touch sensor (e.g. a touch screen or a touch panel) enabling information to be input by a touch on screens of various kinds of display devices has been widely used as an information input device for computer systems. The touch sensor enables a user to simply touch a screen through a finger or a stylus to move or select information displayed on the screen. Consequently, people of all ages and both sexes can easily use the touch sensor.

The touch sensor senses a touch position on the screen of a display device and outputs touch information. A computer system analyzes the touch information and executes a command. A flat display panel, such as liquid crystal display panel, a plasma display panel and an organic light emitting diode display panel, is mainly used as the display device.

Based on the sensing principle thereof, the touch sensor may be of a resistance film type, a capacitive type, an optical type, an infrared rays type, an ultrasonic type or an electromagnetic type. Generally, the touch sensor is manufactured in the form of a panel, which is attached to the top of a display device to perform a touch input function. However, the touch panel is manufactured separately from the display device, resulting in increased manufacturing cost. In addition, the total thickness and weight of the display device are increased. As a result, the mobility of the display device is deteriorated. Furthermore, the display device is restricted in design.

To solve the above problem, in recent years, an in-cell touch sensor formed by placing a touch sensor in a display panel, such as a liquid crystal display panel and an organic light emitting diode display panel, has been developed. A photo touch sensor to recognize a touch according to luminous intensity using a phototransistor or a capacitive touch sensor to recognize a touch according to capacitive variation is mainly used as the in-cell touch sensor.

The photo touch sensor recognizes a touch based on photo leakage current of the phototransistor generated from light incident upon or reflected from a touch body. The capacitive touch sensor recognizes a touch based on variation of capacitance generated when a small amount of electric charge moves to a touch point when a conductive body, such as a human being or a stylus, makes a touch.

In the touch sensor attached on the conventional display device, the display device and the touch sensor are driven independently, and therefore, the display device and the touch sensor can be driven at the same time. In the in-cell type touch sensor mounted in a pixel array of the display device, however, it is not possible to drive the display device and the touch sensor at the same time. Therefore, there is a necessity for a novel method of driving the display device having the in-cell type touch sensor.

SUMMARY OF THE INVENTION

The present invention is directed to a display device having a touch sensor and a method of driving the same that substantially obviate one or more problems due to limitations and disadvantages of the related art.

One object of the present invention is to provide a display device that time divides and alternately drives an in-cell touch sensor and a display area, thereby reducing the occurrence of noise and sensing time, and also a method of driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, as embodied and broadly described herein, a display device may include a display panel including a pixel array including a plurality of pixels and a touch sensor array including a plurality of touch sensors formed in the pixel array, the pixel array and the touch sensor array being divided into a plurality of blocks and driven, a gate driver to sequentially drive a plurality of gate lines in the pixel array in a block unit, a data driver to drive a plurality of data lines in the pixel array whenever the gate lines are driven, a touch controller to sequentially drive the touch sensor arrays in the block unit, and a timing controller to divide one frame into at least one display mode at which the pixel array is driven and at least one touch sensing mode at which the touch sensor array is driven and to control the gate drive, the data driver and the touch controller so that the display mode and the touch sensing mode alternate.

The timing controller may time divide one frame into a plurality of display modes and a plurality of touch sensing modes. The timing controller may also generate and output a mode switching signal to control and alternate the display modes and the touch sensing modes.

The gate driver and the data driver may drive the pixel array in a corresponding block at each of the display modes in response to the mode switching signal, and the touch controller may drive the touch sensor array in a corresponding block at each of the touch sensing modes in response to the mode switching signal.

The timing controller may include a memory to store and output data in the block unit and may supply data stored in the memory to the data driver at a more rapid frequency than a frequency at which data is stored in the memory. Also, the timing controller may convert a plurality of input synchronizing signals into a frequency more rapid than an input frequency and generates a plurality of control signals to control driving timing of the gate driver, the data driver and the touch controller.

The display panel may be a liquid crystal panel or an organic light emitting diode display panel. Also, each of the touch sensors may be a photo touch sensor or a capacitive touch sensor.

In another aspect of the present invention, a method of driving a display device, including a pixel array including a plurality of pixels and a touch sensor array including a plurality of touch sensors formed in the pixel array, includes dividing the pixel array and the touch sensor array into a plurality of blocks, time dividing and driving one frame into at least one display mode at which a pixel array in at least one block is driven and at least one touch sensing mode at which a touch sensor array in the at least one block is driven.

The frame may be time divided into a plurality of display modes and a plurality of touch sensing modes, and the display modes and the touch sensing modes may alternate in response to a mode switching signal.

A pixel array in one block at each of the display modes may be driven, and touch sensor arrays in a plurality of blocks at each of the touch sensing modes may be sequentially driven.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the specific embodiments of the present invention, examples of which are illustrated in the accompanying drawings. Wherever possible, the same reference numbers will be used throughout the drawings to refer to the same or like parts. Detailed description of known arts is omitted if it is determined that the arts can mislead the present invention.

Figure 1:
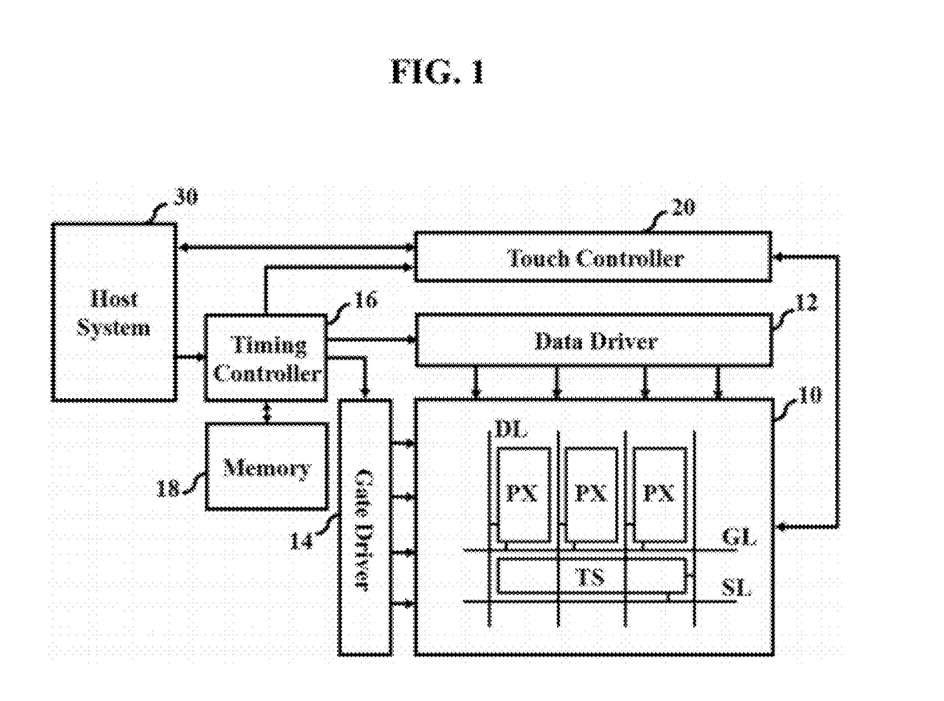
FIG. 1 is a block diagram schematically showing a drive unit of a display device having touch sensors according to an embodiment of the present invention.
Figure 2:
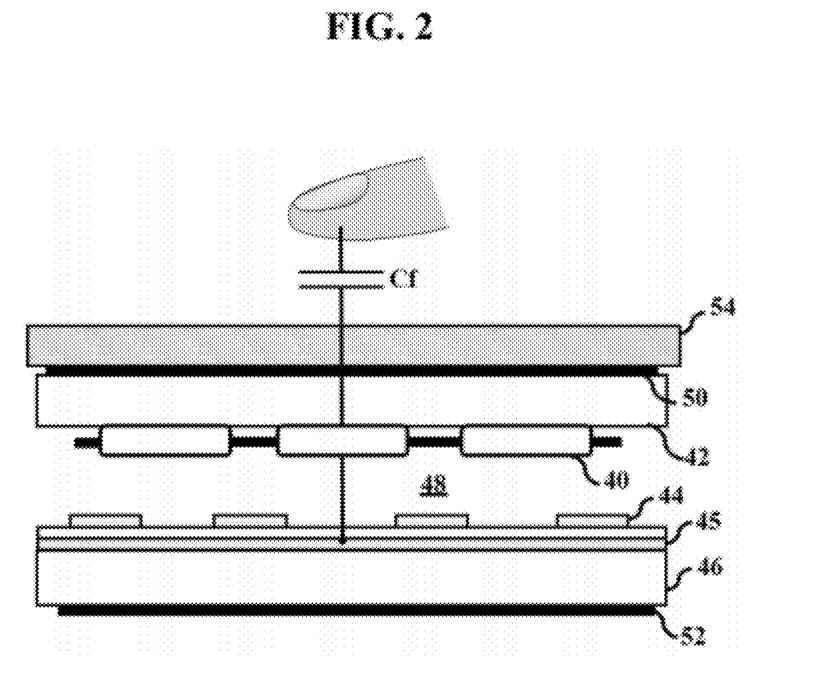
FIG. 2 is a sectional view showing the vertical structure of a display panel in which the touch sensors shown in FIG. 1 are mounted.

FIG. 1 is a block diagram schematically showing a drive unit of a display device having touch sensors according to an embodiment of the present invention and FIG. 2 is a sectional view showing the vertical structure of a display panel 10 shown in FIG. 1.

Referring to FIG. 1, the display device includes a display panel 10 in which touch sensors TS are mounted, a data driver 12 and a gate driver 14 to drive the display panel 10, a timing controller 16 to control a panel drive unit including the data driver 12 and the gate driver 14, and a touch controller 20 to control the touch sensors TS in the display panel 10. The timing controller 16 and the touch controller 20 are connected to a host system 30.

The timing controller 16 and the data driver 12 may be integrated in different integrated circuits (ICs). Alternatively, the timing controller 16 may be mounted in the data driver 12 so as to be integrated in a single IC. The touch controller 20 and the timing controller 16 may be integrated in different ICs. Alternatively, the touch controller 20 may be mounted in the timing controller 16 so as to be integrated in a single IC.

A flat display panel, such as liquid crystal display panel (hereinafter, referred to as a liquid crystal panel), a plasma display panel and an organic light emitting diode display panel, may be used as the display panel 10. Hereinafter, the liquid crystal panel will be described as an example of the flat display panel. When the liquid crystal panel is used as the display panel 10, as shown in FIG. 2, the display panel 10 includes a color filter substrate 42 at which a color filter array 40 is formed, a thin film transistor substrate 46 at which a thin film transistor array 44 and a touch sensor array 45 are formed, a liquid crystal layer 48 between the color filter substrate 42 and the thin film transistor substrate 46, upper and lower polarizing plates 50 and 52 attached at outsides of the color filter substrate 42 and the thin film transistor substrate 46, respectively, and a tempered glass substrate 54 attached on the upper polarizing plate 50. The liquid crystal layer 48 may be driven by a vertical electric field as in a twisted nematic (TN) mode or a vertical alignment (VA) mode. Alternatively, the liquid crystal layer 48 may be driven by a horizontal electric field as in an in-plane switching (IPS) mode or a fringe field switching (FFS) mode.

The display panel 10 includes a pixel array in which a plurality of pixels is arranged and a touch sensor array in which a plurality of touch sensors TS is arranged in the pixel array.

Each pixel of the pixel array realizes a desired color through combination of red, green and blue sub pixels to adjust light transmissivity depending upon variation of liquid crystal arrangement according to a data signal. Each sub pixel PX may include (i) a thin film transistor connected to a gate line GL and a data line DL and (ii) a liquid capacitor and a storage capacitor connected in parallel to the thin film transistor. The liquid capacitor charges voltage difference between a data signal supplied to a pixel electrode through the thin film transistor and common voltage supplied to a common electrode. The liquid capacitor may drive a liquid crystal to adjust light transmissivity. The storage capacitor can stably maintain voltage charged in the liquid crystal capacitor.

The touch sensor array may include a plurality of touch sensors TS connected to a sensor drive line SL and a readout line ROL. A photo touch sensor to recognize a touch according to luminous intensity using a phototransistor or a capacitive touch sensor to recognize a touch according to capacitive variation may be used as a touch sensor TS. The photo touch sensor recognizes a touch based on photo leakage current of the phototransistor generated from light incident upon or reflected from a touch body. The capacitive touch sensor can recognize a touch based on variation of capacitance generated when a small amount of electric charge moves to a touch point when a conductive body, such as a human being and a stylus, makes a touch. For example, the capacitive touch sensor TS forms a touch capacitor Cf with the touch body to vary capacitance and to output a signal corresponding to the capacitance change through the readout line ROL. Each touch sensor TS is constituted by a plurality of pixels, and the size of the touch point may be about 3 to 5 mm. For example, when the line width of the touch point is about 4 mm, each touch sensor TS may be constituted by about 50 pixels.

Figure 5:
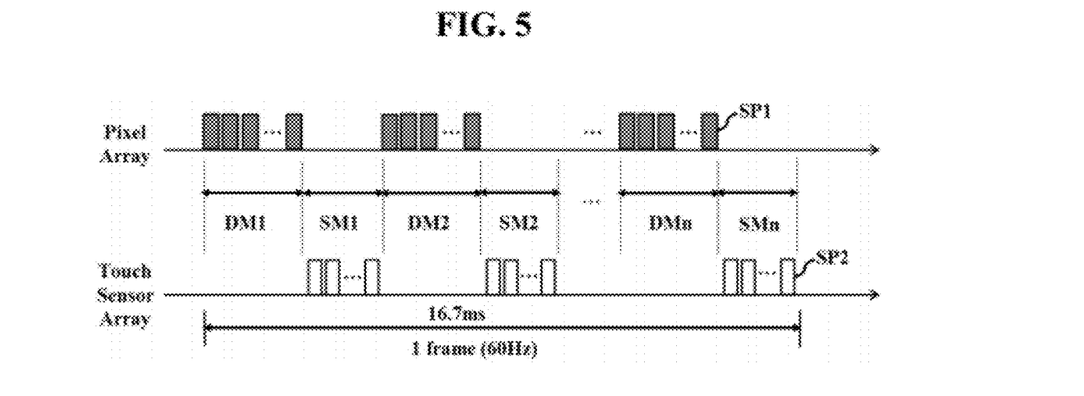
FIG. 5 is a view showing a driving waveform of the display panel in which the touch sensors shown in FIG. 1 are mounted.

As shown in FIG. 5, a driving period for the display panel 10, in which the touch sensors TS are mounted, has a period of time divided into (i) a display mode DM in which data are recorded in the pixel array and (ii) a touch sensing mode SM in which the touch sensor array is driven. The display mode DMn and the touch sending SMn, where n is an integer larger than 0, are alternately driven. To this end, the pixel array and the touch sensor array may be divided into a plurality of blocks. The pixel blocks and the touch sensor blocks are alternately driven.

As shown in FIG. 1, the host system 30 supplies image data and a plurality of synchronizing signals to the timing controller 16, analyzes touch information input from the touch controller 20, and executes a command.

The timing controller 16 performs various signal processes to the image data input from the host computer 30 and supplies the data to the data driver 12. For example, the timing controller 11 may correct and output data through over driving to add an overshoot value or an undershoot value based on data difference between adjacent frames so as to increase response speed of the liquid crystal. Also, the timing controller 16 generates (i) a data control signal to control driving timing of the data driver 12 using the plurality of synchronizing signals, such as a vertical synchronizing signal, a horizontal synchronizing signal, a data enable signal and a dot clock, an input from the host system 30, and (ii) a gate control signal to control driving timing of the gate driver 14. The timing controller 16 outputs the data control signal to the data driver 12 and the gate control signal to the gate driver 14. The data control signal may include a source start pulse and a source sampling clock to control latch of a data signal, a polarity control signal to control the polarity of a data signal, and a source output enable signal to control the output period of a data signal. The gate control signal includes (i) a gate start pulse and a gate shift clock to control scanning of a gate signal and (ii) a gate output enable signal to control the output period of a gate signal.

In particular, in order to time divide the respective frames into a plurality of display modes DM and a plurality of touch sensing modes SM and to alternately drive the display modes DM and the touch sensing modes SM as shown in FIG. 5, the timing controller 16 generates a mode switching signal to switch between the display modes DM and the touch sensing modes SM and controls the data driver 12, the gate driver 14 and the touch controller 20. The timing controller 16 controls the data driver 12 and the gate driver 14 to be driven in the display modes DM and controls the touch controller 20 to be driven in the touch sensing modes SM. Also, the timing controller 16 stores and outputs image data in the memory 18 in a block unit so as to time divide and drive the display panel 10 into a plurality of blocks. The pixel array is driven at a shorter cycle than a normal cycle so as to secure touch sensor driving time while not increasing the period of each frame. To this end, the timing controller 16 controls a clock frequency to read data from the memory 18 to be more rapid than a clock frequency to store data in the memory 18. The timing controller 16 also controls a data control signal and a gate control signal to control the data driver 12 and the gate driver 14 to be rapid.

To this end, a frequency of synchronizing signals, such as a vertical synchronizing signal, a horizontal synchronizing signal, a data enable signal and a dot clock, may be controlled to be more rapid than an input frequency from the host system. For example, the timing controller 16 controls the data driver 12 and the gate driver 14 at 100 Hz, 120 Hz or 180 Hz, which is more rapid than a normal frame frequency, 60 Hz. Also, the timing controller supplies at least one synchronizing signal, which is controlled at a rapid frequency, to the touch controller 20 so that the touch controller 20 can control the touch sensor array to be driven at a rapid speed. Here, the memory 18 may be mounted inside or outside the timing controller 16.

The gate driver 14 divides a plurality of gate lines GL formed at the thin film transistor array of the display panel 10 in a block unit in response to the gate control signal and the mode switching signal from the timing controller 16 and sequentially drives the gate lines GL in a corresponding block at each display mode DM. To this end, the gate driver 14 may be divided into a plurality of blocks. Each of the blocks may commence a scanning operation in response to a mode switching signal at each display mode DM. The gate driver 14 does not drive the gate line GL at the touch sensing mode SM in response to the mode switching signal. The gate driver 14 supplies a scan pulse of gate on voltage during a corresponding scanning period of each gate line GL and supplied gate off voltage during the remaining period. The gate driver 14 is constituted by at least one gate IC. The gate driver 14 may be mounted on a circuit film, such as a tape carrier package (TCP), a chip on film (COF) and a flexible print circuit (FPC), and may be attached to the display panel 10 using a tape automatic bonding (TAB) method or may be mounted on the display panel 10 using a chip on glass (COG) method. Also, the gate driver 14 may be mounted in the display panel 10 using a gate in panel (GIP) method so that the gate driver 14 is formed on the thin film transistor substrate with the pixel array and the touch sensor array.

The data driver 12 supplies a data signal to a plurality of data lines DL of the display panel 10 at each display mode DM in response to the data control signal and the mode switching signal from the timing controller 16. The data driver 12 does not drive the data lines DL at the touch sensing mode SM in response to the mode switching signal. The data driver 12 converts digital data input from the timing controller 16 into positive/negative analog data signals using gamma voltage and supplies a data signal to the date line DL whenever each gate line GL is driven. The data driver 12 is constituted by at least one data IC. The data driver 12 may be mounted on a circuit film, such as a TCP, a COF and a FPC, and may be attached to the display panel 10 using a TAB method or may be mounted on the display panel 10 using a COG method.

The touch controller 20 time divides and drives the touch sensor array at each touch sensing mode SM in response to at least one synchronizing signal and mode switching signal from the timing controller 16, senses a touch based on a readout signal output from the touch sensor TS through the readout line ROL, calculates touch coordinates, and supplies the calculated coordinates to the host system 30. The touch controller 20 may include (i) a readout circuit and a signal processor.

The readout circuit generates sensing data using a readout signal input from the touch sensor TS. The readout circuit may include an amplifier and an analog to digital converter (ADC). The readout circuit compares the readout signal with a predetermined reference voltage and to generate an analog sensing signal which indicates whether a touch has been made. The ADC converts the analog sensing signal into digital sensing data and outputs the digital sensing data to the signal processor.

The signal processor divides the touch sensor array (i.e. sensor driving lines) into a plurality of blocks and drives a corresponding block at each touch sensing mode SM in response to at least one synchronizing signal and a mode switching signal. The signal processor also calculates touch coordinate values using the sensing data from the readout circuit. The signal processor calculates touch coordinate values (XY coordinates) based on position information (X coordinate) of the readout line ROL and position information (Y coordinate) of the driven sensor driving line SL.

The touch controller 20 does not drive the touch sensor array at the display mode DM in response to the mode switching signal.

Figure 3:
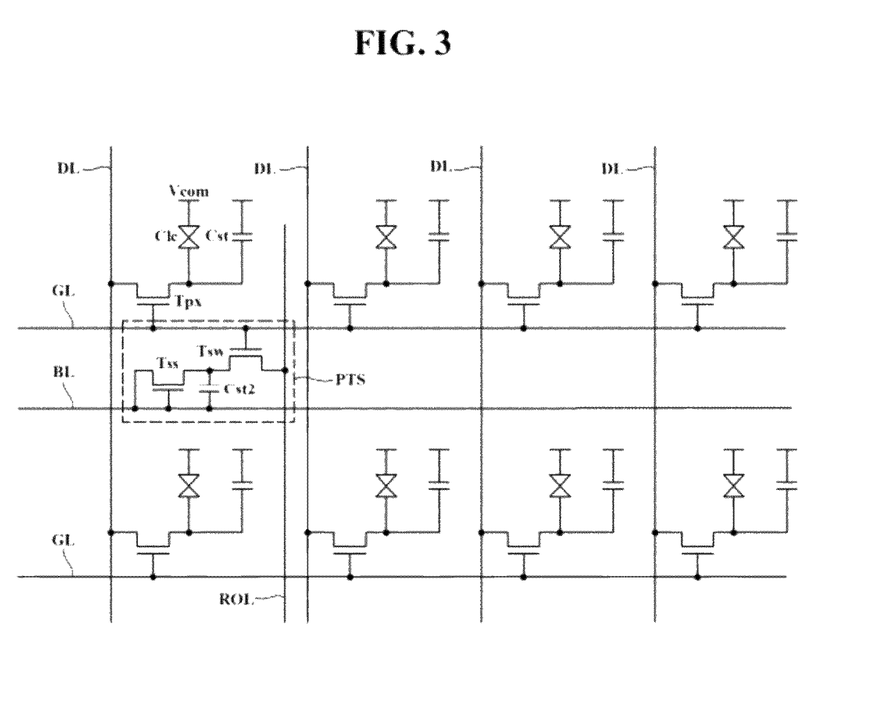
FIG. 3 is an equivalent circuit diagram showing an example of the display panel in which the touch sensors shown in FIG. 1 are mounted.

FIG. 3 is an equivalent circuit diagram of an example of the display panel 10 shown in FIG. 1. Specifically, FIG. 3 shows an equivalent circuit of a liquid crystal panel having a photo touch sensor PTS mounted therein.

Referring to FIG. 3, the photo touch sensor PTS is mounted in the pixel array of the liquid crystal panel. Each sub pixel includes a pixel thin film transistor Tpx formed at each pixel region defined by intersection between the gate line GL and the data line DL and a liquid crystal capacitor Clc and a storage capacitor Cst connected in parallel to the pixel thin film transistor Tpx. The liquid crystal capacitor Clc includes a pixel electrode connected to the pixel thin film transistor Tpx, a common electrode to supply common voltage Vcom, and a liquid crystal layer. A vertical electric field or a horizontal electric field may be applied to the liquid crystal layer by the pixel electrode and the common electrode. The pixel thin film transistor Tpx responses to a gate signal from a corresponding gate line GL and stores a data signal from the data line DL in the liquid crystal capacitor Clc and the storage capacitor Cst. The liquid crystal is driven according to the data signal stored in the liquid crystal capacitor Clc. The storage capacitor Cst stably maintains the data signal to drive the liquid crystal capacitor Clc.

The photo touch sensor PTS may include a sensor thin film transistor Tss to sense a touch according to luminous intensity, a bias line BL (a sensor driving line SL of FIG. 1) to supply bias voltage to the sensor thin film transistor Tss, a storage capacitor Cst2 to store an output signal of the sensor thin film transistor Tss, a switch thin film transistor Tsw to output a signal stored in the storage capacitor Cst2, and a readout line ROL connected to the switch thin film transistor Tsw.

A gate electrode and first electrode of the sensor thin film transistor Tss are connected to the bias line BL, and a second electrode of the sensor thin film transistor Tss is connected to the storage capacitor Cst2. The first and second electrodes become a source electrode and drain electrode according to the direction of current. The storage capacitor Cst2 is connected between the second electrode and the gate electrode of the sensor thin film transistor Tss. A gate electrode of the switch thin film transistor Tsw is connected to the gate line GL, and first and second electrodes of the switch thin film transistor Tsw are connected to the storage capacitor Cst2 and the readout line ROL, respectively.

The sensor thin film transistor Tss generates photo leakage current in response to luminous intensity of incident light or reflected light due to a touch and stores the photo leakage current in the storage capacitor Cst2. The switch thin film transistor Tsw outputs voltage stored in the storage capacitor Cst2 to the readout line ROL in response to a gate signal of the gate line GL. Consequently, the photo touch sensor PTS outputs a signal indicating whether a touch has been made based on luminous intensity of incident light or reflected light to the readout line ROL.

Figure 4:
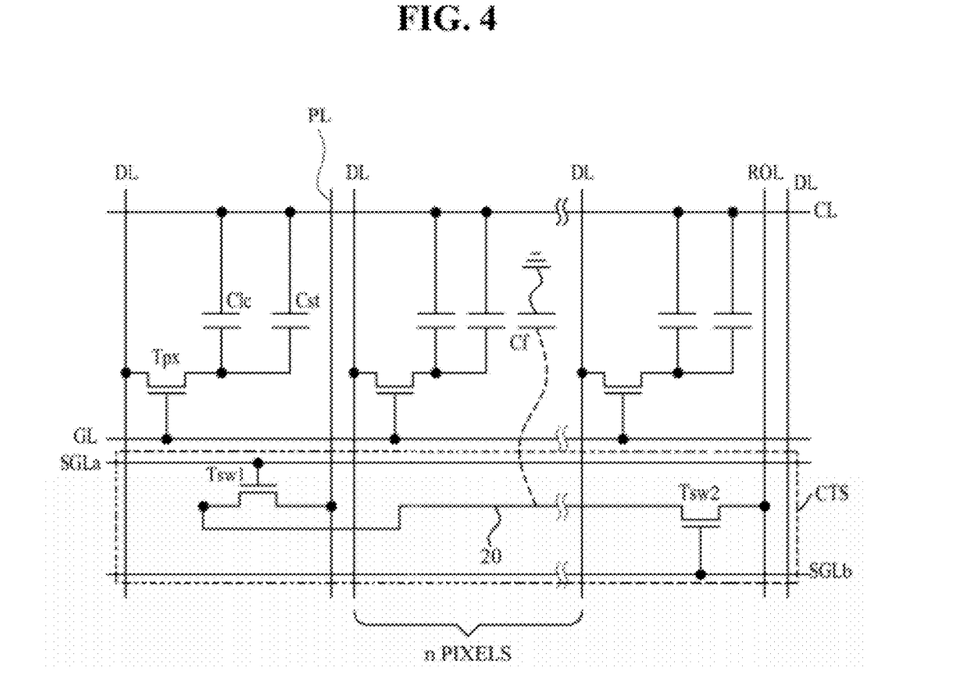
FIG. 4 is an equivalent circuit diagram showing another example of the display panel in which the touch sensors shown in FIG. 1 are mounted.

FIG. 4 is an equivalent circuit diagram of another example of the display panel 10 shown in FIG. 1. Specifically, FIG. 4 shows an equivalent circuit of a liquid crystal panel having a capacitive touch sensor CTS mounted therein.

Referring to FIG. 4, the capacitive touch sensor CTS is mounted in the pixel array of the liquid crystal panel. Each sub pixel may include a pixel thin film transistor Tpx connected to the gate line GL and the data line DL and a liquid crystal capacitor Clc and a storage capacitor Cst connected in parallel to the pixel thin film transistor Tpx, as previously described.

The capacitive touch sensor CTS includes a sensing electrode 20 to form a sensing capacitor Cf with a touch body, a pair of sensor gate lines SGLa and SGLb (sensor driving line SL of FIG. 1), a first switch thin film transistor Tsw1 to form a current path with a power line PL and one end of the sensing electrode 20 in response to control of the first sensor gate line SGLa and a second switch thin film transistor Tsw2 to form a current path with a readout line ROL and the other end of the sensing electrode 20 in response to control of the second sensor gate line SGLb. Here, the power line PL may be replaced by a common line connected to a common electrode of the storage capacitor Cst, and therefore, the power line PL may be omitted.

A gate electrode of the first switch thin film transistor Tsw1 is connected to the first sensor gate line SGLa, a first electrode of the first switch thin film transistor Tsw1 is connected to the power line PL, and a second electrode of the first switch thin film transistor Tsw1 is connected to one end of the sensing electrode 20. The first and second electrodes may become a source electrode and drain electrode according to the direction of current. A gate electrode of the second switch thin film transistor Tsw2 is connected to the second sensor gate line SGLb, a first electrode of the second switch thin film transistor Tsw2 is connected to the readout line ROL, and a second electrode of the second switch thin film transistor Tsw2 is connected to the other end of the sensing electrode 20. The first and second electrodes may become a source electrode and drain electrode according to the direction of current.

The first switch thin film transistor Tsw1 supplies driving voltage Vd from the power line PL to the sensing electrode 20 in response to a gate signal of the first sensor gate line SGLa. At this time, when a touch body touches the surface of the liquid crystal display device, a sensing capacitor Cf is formed between the touch body and the sensing electrode 20. Subsequently, the second switch thin film transistor Tsw2 supplies driving voltage Vd from the power line PL to the sensing electrode 20 and outputs a signal corresponding to the quantity of electric charge induced to the sensing electrode 20 through a touch capacitor Cf in response to a gate signal of the second sensor gate line SGLb.

FIG. 5 is a view showing a driving waveform of the display panel 10 in which the touch sensors shown in FIG. 1 are mounted.

Referring to FIG. 5, one frame (60 Hz, 16.7 ms) is time divided into a plurality of display modes DM and a plurality of touch sensing modes SM. The display modes DM and the touch sensing modes SM are alternately driven. At each display mode DM, a plurality of gate lines GL of a corresponding block is sequentially driven by respective scan pulses SP1. At each touch sensing mode SM, a plurality of sensor driving lines SL of a corresponding block is sequentially driven by respective scan pulses SP2. The display modes DM and the touch sensing modes SM are alternately repeated. The number of the gate lines GL driven at each display mode DM and the number of the sensor driving lines SL driven at each touch sensing mode SM may be different from each other. The period of each display mode DM may be equal to or different from that of each touch sensing mode SM.

For example, if the number of sensor driving lines SL is 16, one frame is divided into 16 display modes DM1 to DM16, and 16 touch sensing modes SM1 to SM16. The display modes DM and the touch sensing modes SM are alternately driven. In some embodiments, the periods of the respective touch sensing modes SM1 to SM16 may be set by experimentally calculating maximum time at which sensing is possible. For example, one frame of 16.7 ms may be time divided and driven into DM1 (0.5 ms)->SM1 (0.5 ms)->DM2 (0.5 ms)->SM2 (0.5 ms)-> . . . DM16 (0.5 ms)->SM16 (0.5 ms)->a blank period (0.7 ms).

FIGS. 6A to 6D are views sequentially showing a case in which the display panel 10 is divided into 16 blocks and is sequentially driven at 16 display modes DM1 to DM16 and 16 touch sensing modes SM1 to SM16.

Referring to FIGS. 6A to 6D according to some embodiments of the present invention, pixels included in one block can be driven at each of the 16 display modes DM1 to DM16, whereas touch sensors included in four blocks can be driven at each of the 16 touch sensing modes SM1 to SM16. In one frame, therefore, the pixel array may be scanned once, and the touch sensor array is scanned four times, thereby improving sensing ability and speed of the touch sensors.

Figure 6A:
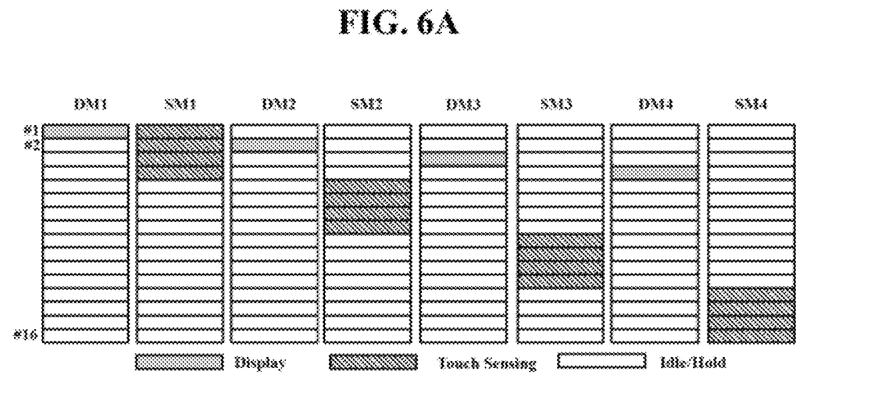
FIGS. 6A to 6D are views sequentially showing a driving region of the display panel according to a sequential division driving sequence according to an embodiment of the present invention.

Specifically, referring to FIG. 6A, the pixels in the first block #1 are driven during the period of the first display mode DM1, and then the touch sensors in the first to fourth blocks #1 to #4 are driven during the period of the first touch sensing mode SM1. The pixels in the second block #2 are driven during the period of the second display mode DM2, and then the touch sensors in the fifth to eighth blocks #5 to #8 are driven during the period of the second touch sensing mode SM2. The pixels in the third block #3 are driven during the period of the third display mode DM3, and then the touch sensors in the ninth to twelfth blocks #9 to #12 are driven during the period of the third touch sensing mode SM3. The pixels in the fourth block #4 are driven during the period of the fourth display mode DM4, and then the touch sensors in the thirteenth to sixteenth blocks #13 to #16 are driven during the period of the fourth touch sensing mode SM4.

Figure 6B:
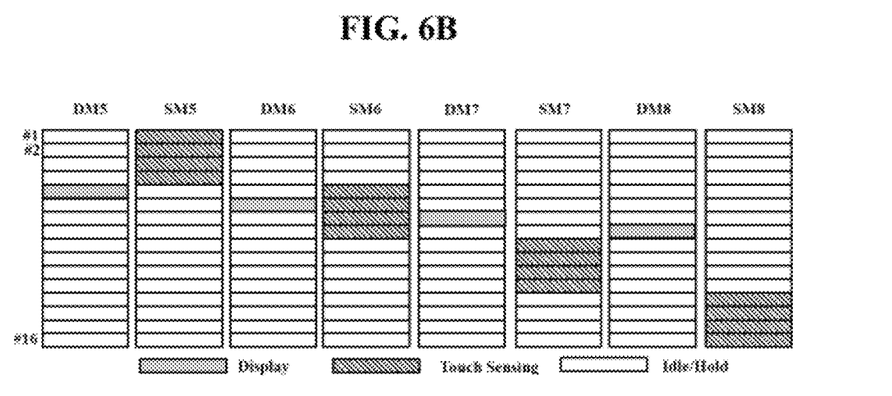

Referring to FIG. 6B, the pixels in the fifth block #5 are driven during the period of the fifth display mode DM5, and then the touch sensors in the first to fourth blocks #1 to #4 are driven during the period of the fifth touch sensing mode SM5. The pixels in the sixth block #6 are driven during the period of the sixth display mode DM6, and then the touch sensors in the fifth to eighth blocks #5 to #8 are driven during the period of the sixth touch sensing mode SM6. The pixels in the seventh block #7 are driven during the period of the seventh display mode DM7, and then the touch sensors in the ninth to twelfth blocks #9 to #12 are driven during the period of the seventh touch sensing mode SM7. The pixels in the eighth block #8 are driven during the period of the eighth display mode DM8, and then the touch sensors in the thirteenth to sixteenth blocks #13 to #16 are driven during the period of the eighth touch sensing mode SM8.

Figure 6C:
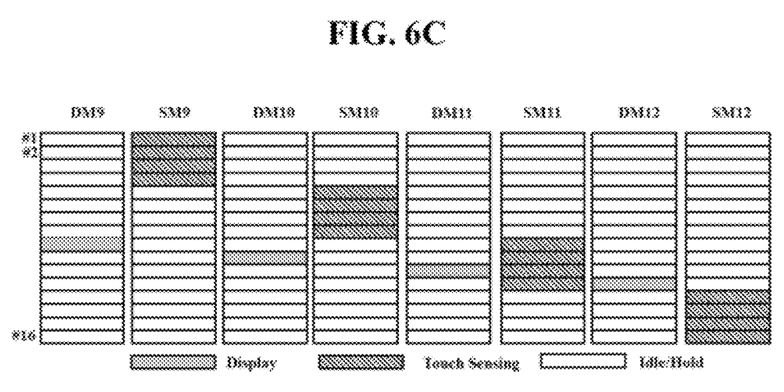

Referring to FIG. 6C, the pixels in the ninth block #9 are driven during the period of the ninth display mode DM9, and then the touch sensors in the first to fourth blocks #1 to #4 are driven during the period of the ninth touch sensing mode SM9. The pixels in the tenth block #10 are driven during the period of the tenth display mode DM10, and then the touch sensors in the fifth to eighth blocks #5 to #8 are driven during the period of the tenth touch sensing mode SM10. The pixels in the eleventh block #11 are driven during the period of the eleventh display mode DM11, and then the touch sensors in the ninth to twelfth blocks #9 to #12 are driven during the period of the eleventh touch sensing mode SM11. The pixels in the twelfth block #12 are driven during the period of the twelfth display mode DM12, and then the touch sensors in the thirteenth to sixteenth blocks #13 to #16 are driven during the period of the twelfth touch sensing mode SM12.

Figure 6D:
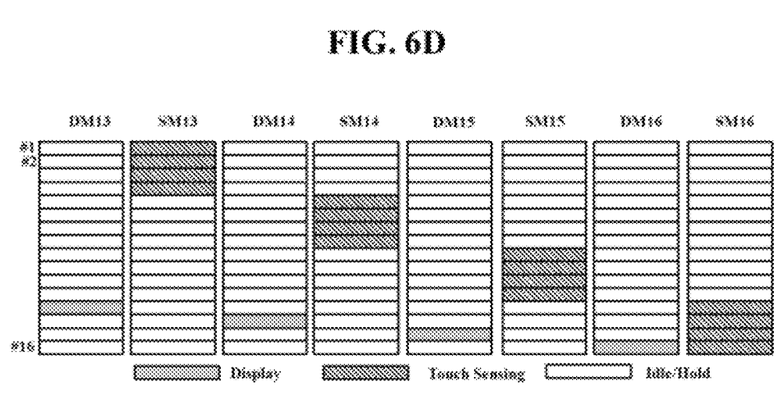

Referring to FIG. 6D, the pixels in the thirteenth block #13 are driven during the period of the thirteenth display mode DM13, and then the touch sensors in the first to fourth blocks #1 to #4 are driven during the period of the thirteenth touch sensing mode SM13. The pixels in the fourteenth block #14 are driven during the period of the fourteenth display mode DM14, and then the touch sensors in the fifth to eighth blocks #5 to #8 are driven during the period of the fourteenth touch sensing mode SM14. The pixels in the fifteenth block #15 are driven during the period of the fifteenth display mode DM15, and then the touch sensors in the ninth to twelfth blocks #9 to #12 are driven during the period of the fifteenth touch sensing mode SM15. The pixels in the sixteenth block #16 are driven during the period of the sixteenth display mode DM16, and then the touch sensors in the thirteenth to sixteenth blocks #13 to #16 are driven during the period of the sixteenth touch sensing mode SM16.

As is apparent from the above description, in a display device having touch sensors according to the present invention and a method of driving the same, the pixel array and the in-cell touch sensor array are time divided and alternately driven, thereby minimizing interference between pixel array driving and touch sensor array driving and the occurrence of noise therefrom and minimizing touch sensing time. Consequently, it is possible to improve sensing ability and speed of the touch sensors.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a display panel comprising (i) a pixel array comprising a plurality of pixels and (ii) a touch sensor array comprising a plurality of touch sensors formed in the pixel array, the pixel array and the touch sensor array being divided into a plurality of blocks;
   a gate driver to sequentially drive a plurality of gate lines in the pixel array in a block unit;
   a data driver to drive a plurality of data lines in the pixel array when the gate lines are driven;
   a touch controller to sequentially drive the touch sensor arrays in the block unit; and
   a timing controller (i) to divide one frame into at least one display mode at which the pixel array is driven, and at least one touch sensing mode at which the touch sensor array is driven, and (ii) to control the gate drive, the data driver and the touch controller so that the display mode and the touch sensing mode alternate, wherein:
the gate driver drives none of the gate lines in the plurality of blocks during the touch sensing mode of the block unit in response to a mode switching signal, and
the data driver drives none of the data lines in the plurality of blocks during the touch sensing mode of the block unit in response to the mode switching signal.

2. The display device according to claim 1, wherein the timing controller time (i) divides one frame into a plurality of display modes and a plurality of touch sensing modes and (ii) generates and outputs the mode switching signal to alternate the display modes and the touch sensing modes.

3. The display device according to claim 2, wherein
the gate driver and the data driver drive the pixels in a corresponding block at each of the display modes in response to the mode switching signal, and
the touch controller drives the touch sensors in a corresponding block at each of the touch sensing modes in response to the mode switching signal.

4. The display device according to claim 1, wherein
the timing controller comprises a memory to store and output data in the block unit and supplies data stored in the memory to the data driver at a more rapid frequency than a frequency at which data is stored in the memory, and
the timing controller converts a plurality of input synchronizing signals into a frequency more rapid than an input frequency and generates a plurality of control signals to control driving timing of the gate driver, the data driver and the touch controller.

5. The display device according to claim 2, wherein the pixels in one block are driven at each of the display modes, and the touch sensors in a plurality of blocks are sequentially driven at each of the touch sensing modes.

6. The display device according to claim 1, wherein the display panel comprises a liquid crystal panel or an organic light emitting diode display panel.

7. The display device according to claim 1, wherein the touch controller drives none of the touch sensors in the plurality of the blocks during the display mode of the block unit in response to the mode switching signal.

8. The display device according to claim 1, wherein each of the plurality of touch sensors is provided for each space between one group of pixels and another group of pixels in the pixel array, the touch sensor detecting a touch by forming a touch capacitor with a touch object for touching the display panel.

9. The display device according to claim 1, wherein each of the plurality of the touch sensors comprises:
a readout line separated from each of the data lines and outputting a sensing signal from the each of the plurality of the touch sensors,
a sensing electrode forming the sensing capacitor with the touch object,
a first sensor gate line and a second sensor gate line separated from each of the gate lines,
a first sensor thin film transistor forming a current path between the sensing electrode and a power line or a common line in response to a control of the first sensor gate line, and
a second sensor thin film transistor forming a current path between the sensing electrode and the readout line in response to a control of the second sensor gate line.

10. The display device according to claim 2, wherein the pixels in one block are driven at each of the display modes, and the touch sensors in more than two blocks are sequentially driven at each of the touch sensing modes.

11. A method of driving a display device comprising (i) a pixel array comprising a plurality of pixels and (ii) a touch sensor array comprising a plurality of touch sensors formed in the pixel array, the method comprising
dividing the pixel array and the touch sensor array into a plurality of blocks;
time dividing and driving one frame into at least one display mode at which a pixel array in at least one block is driven and at least one touch sensing mode at which a touch sensor array in the at least one block is driven,
wherein:
the gate driver drives none of the gate lines in the plurality of blocks during the touch sensing mode of the block unit in response to a mode switching signal, and
the data driver drives none of the data lines in the plurality of blocks during the touch sensing mode of the block unit in response to the mode switching signal.

12. The method according to claim 11, wherein the frame is time divided into a plurality of display modes and a plurality of touch sensing modes, and the display modes and the touch sensing modes alternate in response to the mode switching signal.

13. The method according to claim 12, wherein the pixels in one block are driven at each of the display modes, and the touch sensors in a plurality of blocks are sequentially driven at each of the touch sensing modes.

14. The method according to claim 11, wherein the touch controller drives none of the touch sensors in the plurality of the blocks during the display mode of the block unit in response to the mode switching signal.

15. The method according to claim 11, wherein each of the plurality of touch sensors is provided for each space between one group of pixels and another group of pixels in the pixel array, the touch sensor detecting a touch by forming a touch capacitor with a touch object for touching the display panel.

16. The method according to claim 11, wherein each of the plurality of the touch sensors comprises:
a readout line separated from each of the data lines and outputting a sensing signal from the each of the plurality of the touch sensors,
a sensing electrode forming the sensing capacitor with the touch object,
a first sensor gate line and a second sensor gate line separated from each of the gate lines,
a first sensor thin film transistor forming a current path between the sensing electrode and a power line or a common line in response to a control of the first sensor gate line, and
a second sensor thin film transistor forming a current path between the sensing electrode and the readout line in response to a control of the second sensor gate line.

17. The method according to claim 12, wherein the pixels in one block are driven at each of the display modes, and the touch sensors in more than two blocks are sequentially driven at each of the touch sensing modes.

* * * * *